(12) United States Patent
Dinescu et al.

(10) Patent No.: US 11,738,586 B2
(45) Date of Patent: Aug. 29, 2023

(54) HEAT TRANSFER LABEL

(71) Applicant: Avery Dennison Retail Information Services LLC, Mentor, OH (US)

(72) Inventors: Liviu Dinescu, Huntersville, NC (US); Osman Tanrikulu, Denver, NC (US); Andrew Lillesaeter-Spendlove, Kaupanger (NO)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 17/655,386

(22) Filed: Mar. 18, 2022

(65) Prior Publication Data

US 2022/0203744 A1 Jun. 30, 2022

Related U.S. Application Data

(62) Division of application No. 16/142,210, filed on Sep. 26, 2018.

(Continued)

(51) Int. Cl.
*B44C 1/17* (2006.01)
*G09F 3/02* (2006.01)
(Continued)

(52) U.S. Cl.
CPC ............ *B41M 5/363* (2013.01); *B41M 5/392* (2013.01); *B41M 5/42* (2013.01); *B44C 1/17* (2013.01); *B44C 1/1712* (2013.01); *B44C 1/1716* (2013.01); *D06P 1/5292* (2013.01); *D06P 3/52* (2013.01); *D06P 5/007* (2013.01); *B32B 2250/05* (2013.01); *G09F 2003/0211* (2013.01); *Y10T 428/24802* (2015.01)

(58) Field of Classification Search
CPC ........ B41M 5/363; B41M 5/392; B41M 5/42; B44C 1/17; B44C 1/1712; B44C 1/1716; D06P 1/5292; D06P 3/52; D06P 5/007; Y10T 428/24802; B32B 2250/05; G09F 2003/0211
See application file for complete search history.

(56) References Cited

U.S. PATENT DOCUMENTS 5,130,293 A 7/1992 Saito et al.
5,674,805 A 10/1997 Simpson et al.
(Continued)

FOREIGN PATENT DOCUMENTS

CN 1204374 1/1999
CN 1741862 3/2006
(Continued)

OTHER PUBLICATIONS

Invitation to Pay Additional Fees dated Dec. 14, 2018 issued in corresponding IA No. PCT/US2018/052805 filed Sep. 26, 2018.
(Continued)

*Primary Examiner* — Laura C Powers

(57) ABSTRACT

The present invention relates to heat transfers that include silicone based heat transfer inks and digitally printed toner images, particularly for use on fabrics, apparel items, garments and accessories. The present subject matter is especially suitable for use in heat-transferable labeling or creating embellishments on polyester fabrics and garments.

4 Claims, 2 Drawing Sheets

Related U.S. Application Data

(60) Provisional application No. 62/563,181, filed on Sep. 26, 2017.

(51) Int. Cl.
*B41M 5/36* (2006.01)
*B41M 5/42* (2006.01)
*B41M 5/392* (2006.01)
*D06P 5/24* (2006.01)
*D06P 1/52* (2006.01)
*D06P 3/52* (2006.01)

(56) References Cited

U.S. PATENT DOCUMENTS

| | | |
|---|---|---|
| 6,248,435 B1 | 6/2001 | Leek |
| 6,521,327 B1 | 2/2003 | Kranke |
| 7,906,189 B2 | 3/2011 | Tsai et al. |
| 9,315,682 B2 | 4/2016 | Delys et al. |
| 9,701,153 B2 | 7/2017 | Chiao et al. |
| 2003/0091799 A1 | 5/2003 | Franke |
| 2004/0210022 A1* | 10/2004 | Doshi ............... C09D 175/04 528/33 |
| 2007/0009732 A1* | 1/2007 | Tsai ................. D06P 5/003 428/347 |
| 2007/0141250 A1 | 6/2007 | Mei |
| 2011/0289647 A1 | 12/2011 | Chiao et al. |
| 2015/0004336 A1* | 1/2015 | Delys ............... C08L 83/04 428/196 |
| 2016/0129718 A1 | 5/2016 | O'Leary et al. |
| 2017/0141250 A1 | 5/2017 | Cho et al. |

FOREIGN PATENT DOCUMENTS

| | | |
|---|---|---|
| CN | 104011290 | 8/2014 |
| CN | 105899370 | 8/2016 |
| JP | 2-52788 | 2/1990 |
| WO | 2013/096394 | 6/2013 |

OTHER PUBLICATIONS

International Search Report and Written Opinion dated Feb. 7, 2019 issued in corresponding IA No. PCT/US2018/052805 filed Sep. 26, 2018.
International Preliminary Report on Patentability dated Mar. 31, 2020 issued in corresponding IA No. PCT/US2018/052805 filed Sep. 26, 2018.

* cited by examiner

HEAT TRANSFER LABEL

CROSS REFERENCE TO RELATED APPLICATION(S)

This application claims the benefit of U.S. patent application Ser. No. 16/142,210 filed on Sep. 26, 2018, and U.S. Provisional Application No. 62/563,181 filed Sep. 26, 2017, both of which are incorporated herein by reference in entirety.

FIELD OF THE DISCLOSURE

The present subject matter relates to heat transfers that include silicone based heat transfer inks and digitally printed toner images, particularly for use on fabrics, garments, and accessories. The present subject matter is especially suitable for use in heat-transferable labeling of polyester fabrics and garments and the like.

BACKGROUND

Transfer decoration, labels, patches, tags, identification placards, embellishments and the like are widely used for a variety of different applications including logos, trademarks, keyboard symbols, whether numeric, alphabetic or alphanumeric or other symbols, sports designs, logos and names, fabric and clothing design details, accents and backgrounds, artwork of various shapes and the like. At times these are referred to herein as designs, images and/or indicia. In some applications, these decorative components are in the nature of heat transfers, often referred to as labels, suitable for application on fabrics, clothing and accessories that are of the performance fabric variety exhibiting a relatively high degree of susceptibility to damage upon being subjected to heat transfer application. Such performance fabrics, clothing, apparel and accessories to be enhanced with heat transfer decorative components often concern so-called "soft goods," a term generally understood in the art. Examples include clothing, upper bodywear, lower bodywear, headwear, footwear, outerwear, underwear, garments, sportswear fabrics, other sheet goods, banners, flags, athletic or sport clothing, uniforms, and combinations thereof.

Performance fabrics for soft goods or the like can include those exhibiting stretchability, soft touch tactile characteristics, and vivid color appearance, while being flexible in process manufacturing. Typical synthetic fibers suitable for inclusion in the performance fabric category include polyesters, polyamides, nylons, and combinations of such materials with cotton and/or stretchable or resilient materials such as spandex or elastane or Lycra® and the like. Performance fabrics are a particular challenge for heat transfers.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

The present disclosure provides a heat transfer label construction for fabrics and textiles, especially for garments made of performance fabrics. The heat transfer label construction is also suitable for apparel, garments, and accessories made of cotton and cotton blends.

The printed ink design layer includes an image that is digitally printed in a laser printing process which may use toner or ink. By using a silicone based compatibility layer or additive, the image, for example one created by a toner based system, is fixed to enable adherence to the transfer portion of the label construction, and in particular to a heat transfer silicone based ink layer. The compatibility layer or additive further allows for improved interfacing of water based inks to the heat transfer silicone ink without degrading the curing process.

In one aspect there is provided a heat transfer label that includes a support portion having a label carrier and a release layer; and a transfer portion. The transfer portion is positioned over the support portion release layer for transfer of the transfer portion from the support portion to a fabric substrate under conditions of heat and pressure.

In another embodiment, the transfer portion includes a heat transfer silicone ink layer having a first surface and a second surface, with the first surface being exposed to permit direct contact with a fabric substrate to be labeled. An image layer that includes a printed toner layer is provided along with a compatibility layer in contact with the second surface of the heat transfer silicone ink layer. The compatibility layer adheres the toner layer to the heat transfer silicone ink layer.

The heat transfer silicone ink layer may include a silicone ink base composition; a pigment; and a heat-transfer adhesion promoter being one or more of the group that includes; (i) a hydrogen bonded silicon; (ii) an organosilane; and (iii) a metal chelate. The heat transfer silicone ink layer may further include at least one heat transfer adhesive.

The compatibility layer may be formed from a composition comprising decamethyltetrasiloxane, tetraethyl orthosilicate and Titanium (IV) butoxide.

In one embodiment of the present invention, the image layer further includes a printed water based ink layer in addition to the image layer.

In a further aspect of the present invention, there is provided a heat transfer label that includes a support portion and a transfer portion. The transfer portion includes a heat transfer silicone ink layer which has a first surface and a second surface. The first surface is exposed to permit direct contact with a fabric substrate to be labeled. An image layer is provided and includes a printed toner layer which is in contact with the second surface of the heat transfer silicone ink layer. The heat transfer silicone ink layer includes a compatibility additive for adhering the image layer to the heat transfer silicone ink layer.

DETAILED DESCRIPTION

Detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
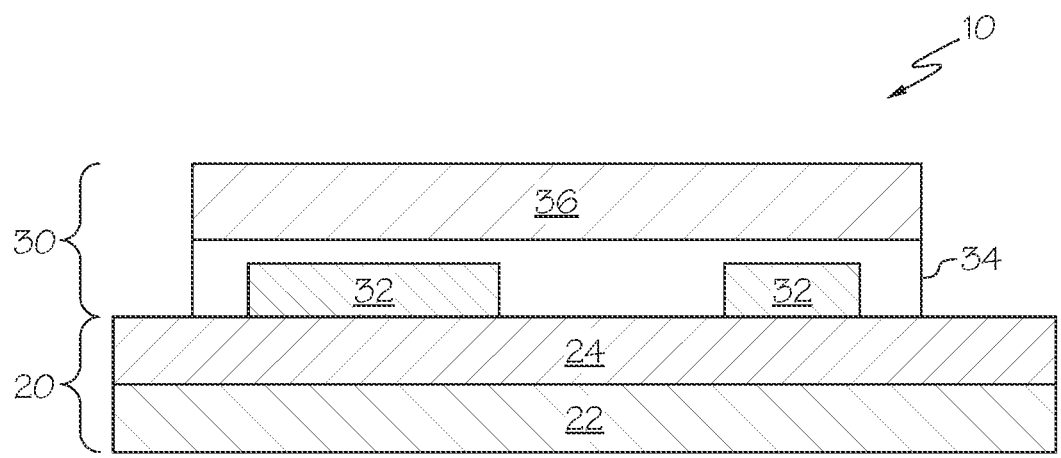
FIG. 1 is a schematic section view of a first embodiment of a heat transfer label assembly according to the present disclosure.

FIG. 1 is a schematic representation of a heat transfer label construction and illustrates a first embodiment that achieves secure transfer of a desired image, design and/or indicia to a fabric substrate. The label construction 10 includes a support portion 20 and a transfer portion 30. Support portion 20 includes a label carrier 22 and a release layer or coating 24.

The support portion 20 typically has the function of providing mechanical strength to the label assembly, allowing handling such as being wound up in a roll for storage, stacking, and as a label feed for mechanized operations. Typical label carrier sheets are cellulosic or polymeric film, such as heat stabilized polyethylene terephthalate (PET). The back of the film may be coated against static build up and blocking when the films are stacked against each other. In one embodiment, the thickness of the carrier is 4 mil (100 μm). Thinner films, such as those having a thickness of 50 to 75 μm, may also be used. Label carrier 22 may also be coated with one or more layers to provide a matting effect.

Release layer 24 is coated or printed on carrier 22. In one embodiment, a release layer is coated on both sides of the carrier 22. The release layer also functions as a thermal release to permit the separation of the transfer portion 30 from the support portion 20 after the heat transfer. The release layer may be based on polymer waxes that manifest affinity for the toners used in commercial digital printing, such as the digital printing process of HP® Indigo® printers. Examples of suitable polymeric waxes for the release layer include polyethylene acrylic and methacrylic acids (EAA and EMA), polyolefin waxes that are made polar by an oxidationprocess. The release layer may also contain anti-blocking additives, which facilitate the release layer detaching from the carrier when the latter is peeled during the heat transfer process. Examples of release additives are polar waxes compatible with EAA, such as carnauba and montan waxes. Other release additives include polytetrafluoroethylene particles either in neat form or as composite particulates with other polyolefins. In one embodiment, the preferred coat weight of the release layer is in the range of 0.5 to 5 gsm.

Transfer portion 30 generally includes a toner image layer 32, compatibility layer 34 overlying the toner image layer 32, and a heat transfer silicone ink layer 36. The release layer 24 receives the toner image layer 32. Toner image layer 32 is generally digitally printed using a liquid electrophotographic process by which electrically-charged liquid inks, i.e., toners, are dried and applied to the release layer via a thermal blanket. Liquid toners typically include pigments, binder, carrier solvent, dispersing agents and charge additives. The toner image layer 32 may be printed using HP® Indigo® digital machines in sheet-fed format. It should be understood that other printing technologies, including a continuous or roll-to-roll format may be used.

Overlying toner image layer 32 is compatibility layer 34, which fixes the toner image and provides an interface for the subsequently applied heat transfer silicone based ink layer 36. In one embodiment, the compatibility layer includes the following components:

| Component | Weight % |
|---|---|
| Silicone fluid: decamethyltetrasiloxane (Dow Corning OS 30) | 99.4% |
| Tetraethyl orthosilicate (TEOS, Aldrich) | 0.5% |
| Titanium (IV) butoxide | 0.1% |

The compatibility layer 34 may interact with the polymers of the underlying toner image layer 32 to strengthen the toner layer against water and abrasion. For example, the compatibility layer could crosslink the polymers of the toner image layer if the polymers of the toner image layer contain chemical moieties such as hydroxyl or carboxyl groups. In addition, the compatibility layer may block and restrict possible migration of contaminants originating in the release layer from reaching the overlying heat transfer silicone ink layer 36. Contaminants such as amines species could poison and render inactive the Pt hydrosilylation catalyst used in curing the silicone inks.

The compatibility layer could also include silica precursors such as organic silicates (tetraethyl orthosilicate and similar, organic silanes that possess chemical moieties capable to reach with potential chemical toner functionality (hydroxyl, carboxyl). Examples of these reactive silanes include (3-Glycidyloxypropyl)trimethoxysilane, 2-(3,4-Epoxycyclohexyl)ethyltriethoxysilane). The compatibility layer also could include silanes that are able to participate in the in hydrosililation chemical curing of the silicone ink they are interfacing. One example of such molecule is a Trimethoxy(vinyl)silane coupling agent.

The compatibility 34 layer may also contain colloidal silica dispersed in a fluid (solvent or water with solvent). Preferred are the silica known to exhibit elongated or string like particles. Examples of such colloidal silicas are Nissan Chemical's ORGANOSILICASOL:IPA-ST-UP and MEK-ST-UP.

The compatibility layer 34 may be coated onto the toner image layer using a Meyer Rod (numbers 6-10) and dried in an oven at 100° C. for 1 minute, resulting in a thin transparent compatibility layer that is 1 gsm or less.

Overlying the compatibility layer 34 is a heat transfer silicone ink layer 36. In most applications, the heat transfer silicone ink layer 36 is a white layer. In one embodiment, the heat transfer silicone ink layer is prepared in accordance with the composition described in US Patent Publication US 2015/0004336, the contents of which are incorporated herein by reference.

In one embodiment, the heat transfer silicone ink layer 36 is a heat-transfer textile ink that includes: (a) a silicone ink base composition; (b) a pigment; and (c) a heat-transfer adhesion promoter being one or more of the group that includes: (i) a hydrogen bonded silicon; (ii) an organosilane; and (iii) a metal chelate.

Suitable pigments are known in the art, and are not further discussed in detail. They include all types of pigments, inks, tinctures, dyes, colorants and "colors", and are included in the relevant proportions known in the art to provide the required image quantity and quality. Suitable pigments and dyes include but are not limited to carbon black, titanium dioxide, chromium oxide, bismuth vanadium oxide and the like. The pigments may be dispersed in the heat-transfer textile ink composition at the ratio of 25:75 to 70:30 to the silicone ink base.

The heat transfer silicone ink may include any proportions and/or ratios of the heat transfer adhesion promoters listed above, such as in the amount of 0.1 wt % to 10 wt %, alternatively in the range 0.5 wt % to 5 wt %.

The hydrogen bonded silicon of group (c) (i) may include

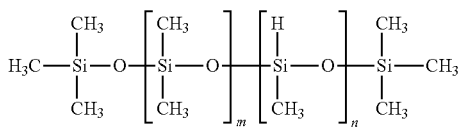

wherein m is in the range 0 and 120, and n is in the range 1 to 120. Alternatively, one or more different hydrogen bonded silicones may be included as the adhesion promoter.

The organosilane of group (c) (ii) may be a silane, an oligomeric reaction product of the silane, or a combination thereof, in particular an alkoxysilane. Alternatively, the organosilane may include either: (i) the formula R3bSiR4(4–b), where each is independently a monovalent organic group; each R4 is an alkoxy group; and b is 0, 1, 2, or 3; or (ii) the formula R5cR6dSi(OR5)4-(c+d) where each R5 is independently a substituted or unsubstituted, monovalent hydrocarbon group having at least 1 carbon atom and each R6 contains at least one SiC bonded group having an adhesion-promoting group, such as amino, epoxy, mercapto or acrylate groups, c is 0, 1 or 2, d is 1 or 2, and the sum of c+d is not greater than 3, or a partial condensate thereof.

The organosilane may include an alkoxysilane exemplified by a dialkoxysilane, such as dialkyldialkoxysilane or a trialkoxysilane, such as an alkyltrialkoxysilane or alkenyltrialkoxysilane, or partial or full hydrolysis products thereof, or another combination thereof.

The metal chelate of group (c)(iii) may include any suitable metal (such as zirconium (IV) or titanium), in the form of suitable chelate complexes such as tetraacetylacetonate, hexafluoroacetylacetonate, trifluoroacetylacetonate, tetrakis (ethyltrifluoroacetylacetonate), tetrakis (2,2,6,6-tetramethyl-heptanedionato), dibutoxy bis(ethylacetonate), diisopropoxy bis(2,2,6,6-tetramethyl-heptanedionato), or β-diketone complexes, including alkyl-substituted and fluoro-substituted forms thereof. Alternatively, the metal chelate is a zirconium chelate, optionally zirconium acetyl acetonate, such as zirconium tetrakisacetylacetonate (also termed "Zr(AcAc)4"), (including alkyl-substituted and fluoro-substituted forms thereof).

The silicone ink base composition may include one or more silicone ink base compositions known in the art, and the invention is not limited thereto. Alternatively, the silicone ink base is as defined in US Patent Publication US 2007/141250, incorporated herein by reference. Alternatively, the silicone ink base composition for the heat transfer textile ink may include:

(A) 100 parts by weight of a liquid polydiorganosiloxane containing at least two alkenyl radicals in each molecule, (B) an organohydrogenpolysiloxane containing at least three silicon-bonded hydrogen atoms in each molecule, in an amount that the molar ratio of the total number of the silicon bonded hydrogen atoms in this ingredient to the total quantity of all alkenyl radicals in ingredient (A) is from 0.5:1 to 20:1, (C) from 5 to 50 parts by weight of a reinforcing filler, based on the amount of ingredient (A), (D) from 0.05 to 4.5 parts by weight of a polydiorganosiloxane-polyether copolymer containing from 5 to 50 percent by mole of the polyether, based on 100 parts by weight of the combined weight of ingredients (A), (B), and (C), and (E) a hydrosilylation catalyst.

In one embodiment, the heat transfer silicone ink layer further includes one or more heat transfer adhesives. Such adhesives are well known for this purpose. For example, the heat transfer adhesive may include a thermoplastic polymer resin.

Curing of the heat transfer silicone ink layer is catalyzed by ingredient (E), which may be a metal selected from the platinum group of the periodic table, or a compound of such metal. The metals include platinum, palladium and rhodium. Platinum and platinum compounds are preferred due to the high activity of these catalysts in hydrosilylation reaction.

The label of FIG. 1 may be transferred to a substrate such as a fabric or textile by placing the label assembly over the substrate, applying heat, and removing the support structure to leave the transfer portion as a lasting image on the substrate.

Figure 2:
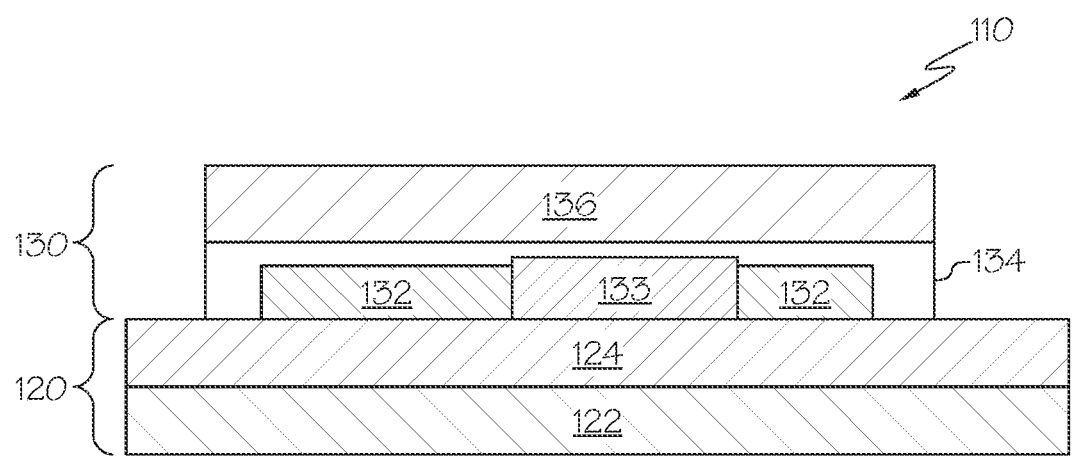
FIG. 2 is a schematic section view of a second embodiment of a heat transfer label assembly that further includes a water-based ink layer according to the present disclosure.

FIG. 2 is a schematic representation of another heat transfer label construction that includes a water-based image layer in addition to a toner image layer. The label construction 110 includes a support portion 120 and a transfer portion 130. Support portion 120 includes a label carrier 122 and a release layer or coating 124.

Transfer portion 130 is similar in most respects to transfer portion 30, the principal difference between the two is that a water based image layer 133 is included in the construction. The water based ink layer 133 may be printed directly onto release liner 124 such that it does not overlap toner image layer 132. Alternatively, water based ink layer 133 may overlap portions of toner image layer 132. Alternatively, water based ink layer 133 may cover completely the toner layer 132. In this case the water based ink will contain the reactive ingredients need to fixate chemically the toner image. Water based ink layer 133 may be formed by screen printing, ink jet printing, gravure printing, flexographic printing, or the like.

Compatibility layer 134 overlies toner image layer 132 and water based ink layer 133 to block and restrict possible migration of contaminants originating in the release layer or the water based ink from reaching the overlying heat transfer silicone ink layer 136. Contaminants such as amines species could poison and render inactive the Pt hydrosilylation catalyst used in curing the silicone inks. Not only are there volatiles amines used in producing the water based anionic polymer dispersions, there may also be amino group containing polymers in either the polymer backbone or at the polymer end (i.e., polyamides, polyurethanes, etc.)

Overlying the compatibility layer 134 is heat transfer silicone ink layer 136. The label of FIG. 2 may be transferred to a substrate such as a fabric or textile by placing the label assembly over the substrate, applying heat, and removing the support structure to leave the transfer portion as a lasting image on the substrate.

Figure 2A:
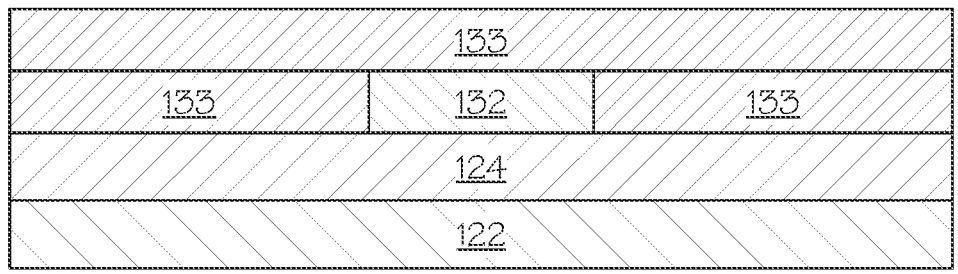
FIG. 2A provides a further schematic section view of a further embodiment of the heat transfer label shown in FIG. 2.

Attention is directed to FIG. 2A which shows an alternate embodiment of FIG. 2 in which the water based ink layer 133 substantially covers the image toner layer 132.

Figure 2B:
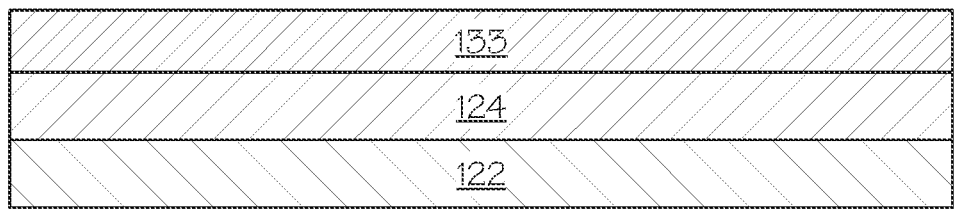
FIG. 2B illustrates a further schematic section view of a further embodiment of the heat transfer label shown in FIG. 2.

FIG. 2B is a further embodiment of the heat transfer label of the present invention in which the water based ink layer 133 resides on top of the carrier and/or release layer 122, 124.

In another embodiment of the heat transfer label construction, a compatibility additive is incorporated into a heat transfer silicone ink layer. The label construction includes a support portion and a transfer portion. Support portion includes a label carrier and a release layer or coating.

Toner layer is printed onto release layer. Overlying toner layer is heat transfer silicone ink layer, which is formed from a composition that includes a compatibility additive and a silicone based heat transfer ink. In one embodiment, the silicone based heat transfer ink is prepared in accordance with the composition described in US Patent Publication US 2015/0004336, which is described in more detail above. In one embodiment, the compatibility additive includes the following components:

| Component | Weight %* |
|---|---|
| Silicone fluid: decamethyltetrasiloxane (Dow Corning OS 30) | 10.0% |
| Tetraethyl orthosilicate (TEOS, Aldrich) | 0.5% |
| Titanium (IV) butoxide | 0.1% |

*based on the total weight of the heat transfer silicone ink layer

The compatibility additive when incorporated into the silicone based heat transfer ink provides similar advantages as a separate compatibility layer, and does not interfere with the silicone crosslinking chemistry of the silicone based heat transfer ink.

Other embodiments, besides those illustrated herein, may also be employed without departing from the scope of the present disclosure. For example, the label can be of a perimeter shape desired for a particular purpose other than the generally circular or cylindrical labels associated with a patch or insignia, for example, taking the form of a decorative embellishment, company logo, or artwork. Other options include enhancing the flexibility of the label or the like by minimizing the thickness and area covered by the second barrier layer, thereby providing improved label performance in terms of being able to better follow bendability or flow of the substrate to which the label is attached, such as fabric or clothing.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A heat transfer label comprising:
a support portion having a label carrier and a release layer; and
a transfer portion, the transfer portion being positioned over said support portion release layer for transfer of the transfer portion from the support portion to a fabric substrate under conditions of heat and pressure, the transfer portion comprising:
a heat transfer silicone ink layer having a first surface and a second surface, the first surface being exposed to permit direct contact with a fabric substrate to be labeled; and
an image layer comprising a printed toner layer, the image layer in contact with the second surface of the heat transfer silicone ink layer;
wherein the heat transfer silicone ink layer comprises a compatibility additive for adhering the toner layer to the heat transfer silicone ink layer, wherein the compatibility additive comprises decamethyltetrasiloxane, tetraethyl orthosilicate, and Titanium (IV) butoxide.

2. The heat transfer label of claim 1, wherein the heat transfer silicone ink layer further comprises:
silicone ink base composition;
a pigment; and
a heat-transfer adhesion promoter being one or more of the group comprising:
a hydrogen bonded silicon;
an organosilane; and
a metal chelate.

3. The heat transfer label of claim 1, wherein the heat transfer silicone ink layer further comprises at least one heat transfer adhesive.

4. The heat transfer label of claim 1, wherein the image layer further comprises a printed water based ink layer.

* * * * *